United States Patent
Wu et al.

(10) Patent No.: US 9,109,600 B2
(45) Date of Patent: Aug. 18, 2015

(54) TWO-STAGE MEDIUM-PRESSURE SCREW-TYPE AIR COMPRESSOR SET

(75) Inventors: Jiangwei Wu, Fenghua (CN); Jiongyan Zhang, Fenghua (CN); Leijie Wang, Fenghua (CN); Zhongping Zhuang, Fenghua (CN); Xibo Yin, Fenghua (CN); Gang Chen, Fenghua (CN); Changhong Wu, Fenghua (CN)

(73) Assignee: NINGBO BAOSI ENERGY EQUIPMENT CO.,LTD, Fenghua (CN)

( * ) Notice: Subject to any disclaimer, the term of this patent is extended or adjusted under 35 U.S.C. 154(b) by 359 days.

(21) Appl. No.: 13/813,877

(22) PCT Filed: Aug. 25, 2011

(86) PCT No.: PCT/CN2011/001418
§ 371 (c)(1),
(2), (4) Date: Feb. 1, 2013

(87) PCT Pub. No.: WO2012/031450
PCT Pub. Date: Mar. 15, 2012

(65) Prior Publication Data
US 2013/0129548 A1    May 23, 2013

(30) Foreign Application Priority Data

Sep. 10, 2010 (CN) .......................... 2010 1 0281883

(51) Int. Cl.
*F04C 29/02* (2006.01)
*F04C 18/16* (2006.01)
*F04C 23/00* (2006.01)
(Continued)

(52) U.S. Cl.
CPC .......... *F04C 29/026* (2013.01); *B01D 17/0214* (2013.01); *B01D 21/0024* (2013.01); *F04C 2/16* (2013.01); *F04C 18/16* (2013.01); *F04C 23/001* (2013.01); *F04C 29/02* (2013.01);
(Continued)

(58) Field of Classification Search
CPC ...... F04C 29/02; F04C 29/026; F04C 29/028; F04C 29/021; B01D 21/0024; B01D 17/0214
USPC .................. 418/84, 85, 97; 210/533–35, 521
See application file for complete search history.

(56) References Cited

U.S. PATENT DOCUMENTS 4,132,645 A * 1/1979 Bottomley et al. ........... 210/104
5,149,344 A * 9/1992 Macy .............................. 96/159
(Continued)

*Primary Examiner* — Alexander Comley
*Assistant Examiner* — Christopher Brunjes
(74) *Attorney, Agent, or Firm* — Wang Law Firm, Inc.; Li K. Wang; Stephen Hsu

(57) ABSTRACT

A two-stage medium-pressure screw air compressor includes a primary screw compressor (21) and a secondary screw compressor (22) communicating with the gas-liquid separator (6) via the first gas-liquid inlet (61). A first oil outlet (63) is connected to a mid section of a gas-liquid separator (6). The oil is injected into the lubricating components of the compressor is the first oil outlet (63), a first filter (64). A secondary oil-water separator (9) is connected to the first oil outlet (63) of the gas-liquid separator (6), the second oil-water separator (6) has an upper separating tank (91) and a lower separating tank. The water and the impurities contained in the lubricating oil can be eliminated at a largest extent, so as to create essential condition thr ensuring the screw compressor to operate continuously, stably and safely and provide high operational reliability, safety and long service life.

8 Claims, 4 Drawing Sheets

(51) Int. Cl.
*B01D 17/02* (2006.01)
*B01D 21/00* (2006.01)
*F04C 2/16* (2006.01)

(52) U.S. Cl.
CPC ............ *F04C 29/028* (2013.01); *F04C 29/021* (2013.01); *F04C 2210/1005* (2013.01)

(56) References Cited

U.S. PATENT DOCUMENTS

| | | | |
|---|---|---|---|
| 6,009,892 A * | 1/2000 | Martinitz | 137/1 |
| 2004/0112679 A1* | 6/2004 | Centers | 184/7.4 |
| 2004/0179957 A1* | 9/2004 | Choroszylow et al. | 417/313 |

* cited by examiner

TWO-STAGE MEDIUM-PRESSURE SCREW-TYPE AIR COMPRESSOR SET

RELATE APPLICATIONS

This application is a national phase entrance of and claims benefit to PCT Application for Two-stage Medium-pressure Screw Air Compressor thereof, PCT/CN2011/001418, filed on Aug. 25, 2011, which claims benefit to Chinese Patent Application 201010281883.X, filed on Sep. 10, 2010. The specifications of both applications are incorporated here by this reference.

FIELD OF THE INVENTION

The present invention relates to the field of the screw air compressor, in particular to a two-stage medium-pressure screw air compressor of which the discharge pressure can reach up to 3.5 MPa; it can be widely used in the civil and industrial sectors such as hydropower, well drilling, the military and the PET blow molding.

DESCRIPTION OF THE PRIOR ART

At present, medium-pressure screw air compressor used at home or abroad mostly comprises a motor, a primary screw compressor and a secondary screw compressor which are respectively driven to work simultaneously by a gear box of the motor, and a gas-liquid separator. During operating, air flows in via a gas inlet and is compressed by the primary screw compressor and the secondary screw compressor, after which the medium-pressure gas is transferred to the gas-liquid separator via gas discharge chamber. Due to the need of being sprayed with such media as water or oil when being compressed, the gas in the two-stage screw compressor mixes with the water or the oil; at the same time, a certain proportion of moisture will be produced during the compression. After being compressed and reaching the designed pressure, the mixed gas is discharged and flows into the gas-liquid separator, which then separates the gas and the liquid from the mixed gas. The compressed air separated by the gas-liquid separator, after being cooled by a cooler when passing through the upper gas outlet passage, is transmitted to the users via a gas tube.

Furthermore, the mid section of the gas-liquid separator is provided with an first oil outlet. The processed liquid (including the moisture and the oil) from the gas-liquid separator, after being eliminated the impurities by an first filter, is transmitted by an oil tube to an oil distributor, the clean lubricating oil is injected into the lubricating components of the two-stage screw compressor so as to lubricate the moving components in the compressor, thereby conducting the closed circulation of the oil.

Due to the comparatively high output pressure of the two-stage medium-pressure screw air compressor, especially when the output pressure reaches up to 3.5 MPa, the compressed air, during the compression, is prone to produce a comparatively high proportion of moisture, which moreover is output accompanying with the oil from the first oil outlet of the gas-liquid separator. If the lubricating oil penetrated with moisture is injected into the screw compressor, the lubrication condition and performance of the moving components therein can be impacted seriously, and the operational performance and service life of the screw compressor can be further affected.

SUMMARY OF THE INVENTION

It is an object of the present invention to provide a two-stage medium-pressure screw air compressor, which adopts a secondary oil-water separator with a compact structure, good operational performance and a long service life.

For achieving the above stated object, the two-stage medium-pressure screw air compressor comprises:
a primary screw compressor driven by a motor; a secondary screw compressor also driven by the motor;
a gas-liquid separator having a side wall with a first gas-liquid inlet connected to the side wall and a first oil outlet connected to a mid section of the side wall, the secondary screw compressor communicating with the gas-liquid separator via the first gas-liquid inlet;
a plurality of oil distributors for receiving processed oil from the gas-liquid separator via the first oil outlet, a first filter, a cooler and an oil tube;
a secondary oil-water separator connected to the first oil outlet of the gas-liquid separator, the secondary oil-water separator having an upper separating tank with a top and a bottom and a lower separating tank with a top and a bottom, a plurality of brackets being mounted on the lower separating, tank and the upper separating tank being mounted on top of the plurality of brackets; a second oil inlet connecting to the top of the upper separating tank, the second oil inlet, having an electromagnetic valve, a second oil outlet connecting to the bottom of the upper separating tank, the second oil outlet having an electromagnetic valve, the second oil inlet connected to the first oil outlet;
an electric ball valve connecting the upper separating tank to the lower separating tank enabling liquid to flow between two separating tanks; and a secondary drain electromagnetic valve connected to the bottom of the lower separating tank.

When the structural design of the above-mentioned secondary oil-water separator is adopted, the processed oil from the gas-liquid separator can be further subjected to a second separation and achieved an elimination of the residual moisture, which has the advantages of the significant improvement of the lubrication condition and performance of the moving components in the compressor, so as to achieve a higher air displacement, a stable pressure discharge and a significantly enhanced operational efficiency.

A second filter for connecting the secondary oil-water separator to the plurality of oil distributors is connected to the second oil outlet. Therefore the solid impurities can be eliminated before the lubricating oil, which passes through the secondary oil-water separator, is injected into the screw compressor.

The second oil outlet of the secondary oil-water separator can be also connected to the lubricating components of the secondary screw compressor, which has the advantages of further improvement of the lubrication condition and performance of the moving components of the secondary screw compressor when in high-pressure working condition, thereby enhancing the operational efficiency and safety.

A transparent tube is connected between the electric ball valve and the upper separating tank the transparent tube is served as an observation window to watch the working condition of the separation of the water and the oil in the secondary oil-water separator.

An oil-water interlace detector is connected to the top of the lower separating tank, which can be used to read and measure the working condition of oil-water interface in the secondary oil-water separator.

The electromagnetic valve of the second oil inlet and the electromagnetic valve of the second oil outlet, the secondary drain electromagnetic valve as well as the electric ball valve are controlled by a Programmable Logic Controller, so as to ensure such items to be correct as the second oil inlet, second oil outlet and the communication of electric ball valve as well as the time, the flow and relevant parameters of the secondary drain, thereby maintaining the designed functions of the secondary oil-water separator.

The motor, the primary screw compressor and the secondary screw compressor, the gas-liquid separator, the first filter, the cooler and the secondary oil-water separator are respectively installed on a base, which has the advantages of the compact structure, artistic appearance and the maximum reduction of floor area.

For achieving the above stated object, another two-stage medium-pressure screw air compressor can also comprise:

a primary screw compressor driven by a motor; a secondary screw compressor, with an output, also driven by the motor;

a gas-liquid separator, with a top, a side wall, having a gas outlet connected on the top, a first gas-liquid inlet connected on the side wall tangentially, and a first oil outlet connected on the side wall below the first gas-liquid inlet, the output of the secondary screw compressor connecting to the first gas-liquid inlet and enabling the secondary screw compressor to communicate with the gas-liquid separator;

a first oil outlet connected to the gas-liquid separator; a first filter connected to the first oil outlet; a cooler, with an inlet, connected to the first filter; a plurality of oil distributor connected to the cooler through an oil tube;

a secondary oil-water separator with an upper separating tank with a top and a lower separating tank with a top and a bottom, the upper separating tank being separated from the lower separating tank by a frame;

a second oil inlet with an electromagnetic valve connected to the top of the upper separating tank: a second oil outlet with an electromagnetic valve connected to the bottom of the upper separating tank, and the second oil inlet being connected to the first oil outlet while the second oil outlet being connected to the oil tube;

an electric, ball valve connecting the upper separating tank to the lower separating tank and enabling liquid to flow between two separating tanks; and a secondary drain electromagnetic valve connected to the bottom of the lower separating tank.

Preferably, the second oil outlet of the secondary oil-water separator is connected to the inlet of the cooler, that is, the oil output from the second oil outlet is transmitted to the oil distributor after being cooled by the cooler.

Compared with prior art, in this invention, the secondary oil-water separator has the functions of high displacement, stable pressure discharge and high operational efficiency; moreover, the gas discharge temperature is comparatively low, just slightly 5~15° C. higher than the ambient temperature; in addition, it is achieved to provide with a low noise and a long service life, an good operational stability and a proper safety.

DETAILED DESCRIPTION OF THE PREFERRED EMBODIMENT

Figure 1:
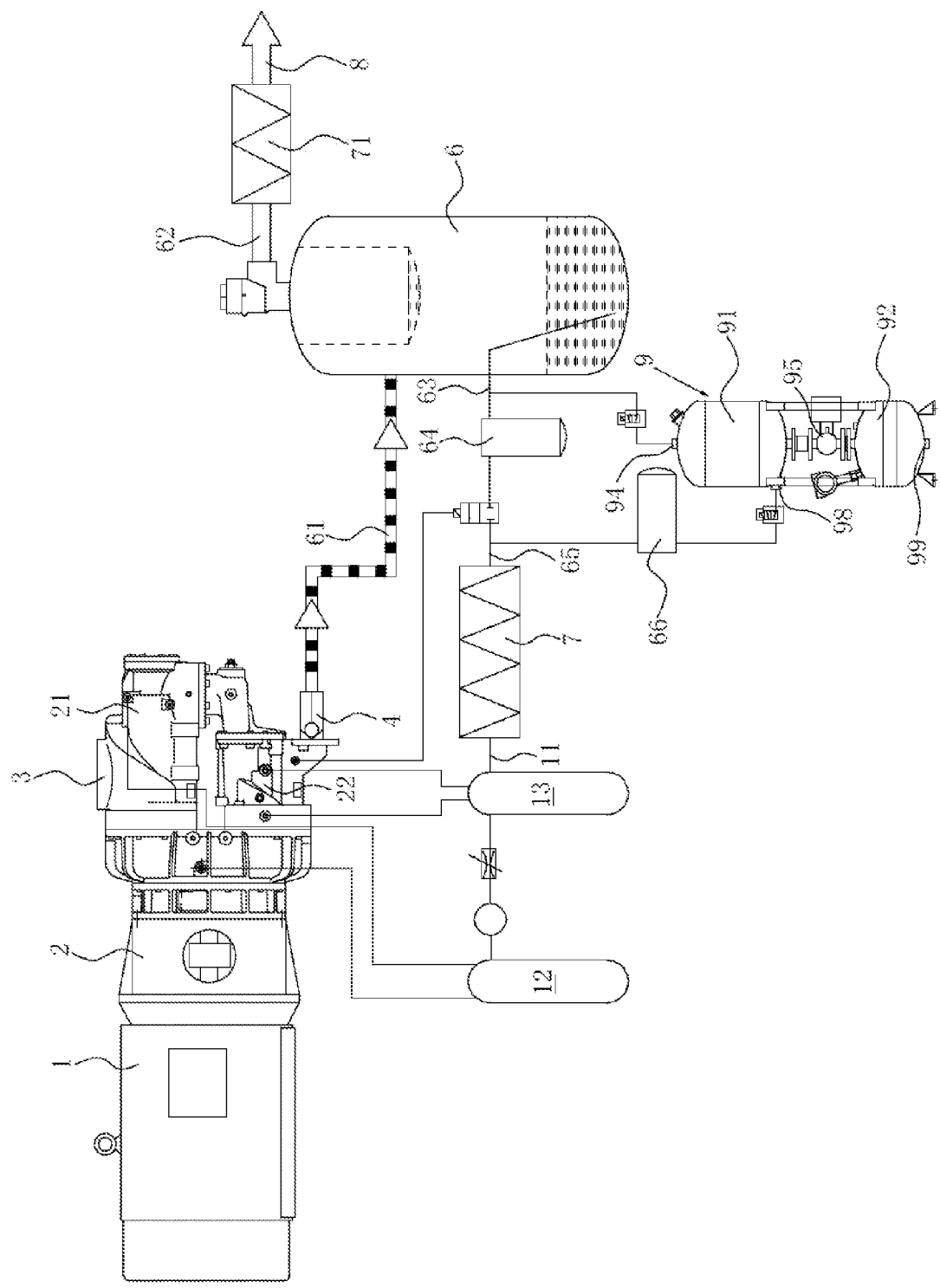
FIG. 1 is a system flow view of a two-stage medium-pressure screw air compressor in accordance with an embodiment of the present invention.

To enable a further understanding of the innovative and technological content of the invention herein, refer to the detailed description of the invention and the accompanying drawings below:

As shown in FIGS. 1 to 4, the two-stage medium-pressure screw air compressor comprises a motor 1 installed on the base 10. A primary screw compressor 21 and a secondary screw compressor 22 are simultaneously driven by the motor 1 via a gear box 2; the air flows into the primary screw compressor and the secondary screw compressor from a gas inlet 3 to be compressed, which can reach up to 3.5 MPa for a medium-pressure gas. The medium-pressure is transmitted to a gas-liquid separator 6 via a gas discharge chamber 4 for separation of the gas and the liquid.

Figure 2:
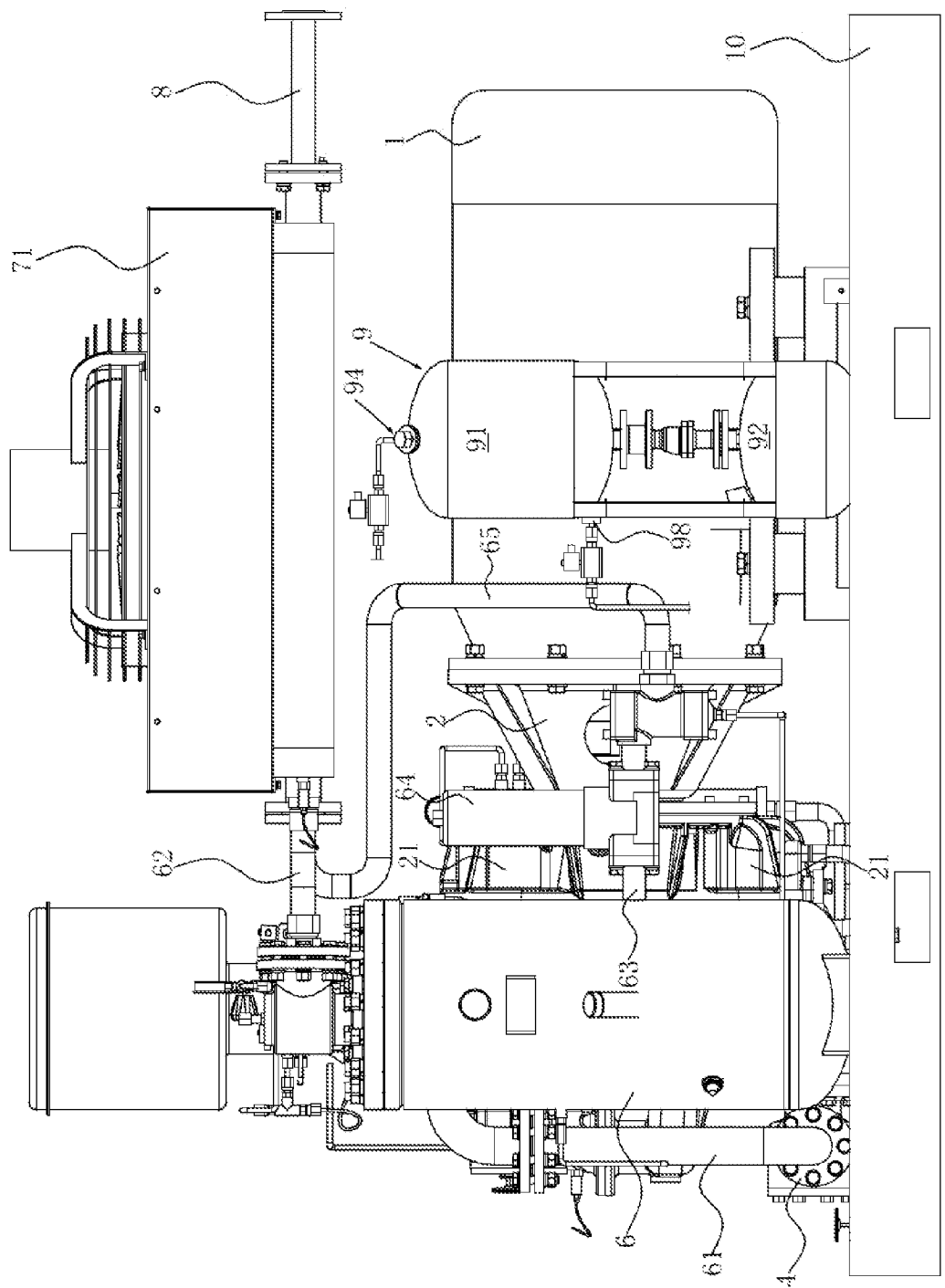
FIG. 2 is a perspective view of a two-stage medium-pressure screw an compressor in accordance with the embodiment of the present invention.
Figure 4:
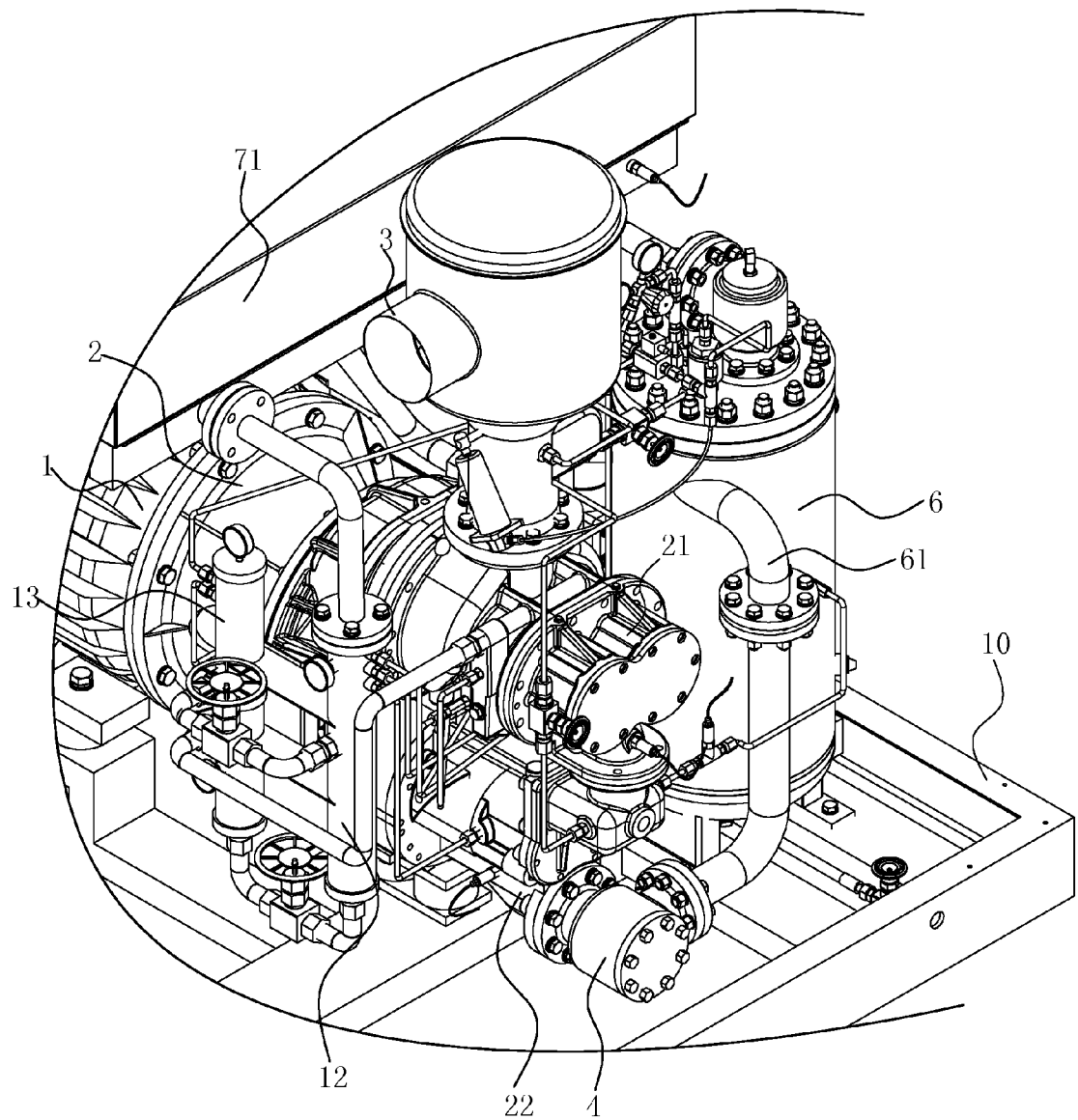
FIG. 4 is a part of perspective view of the two-stage medium-pressure screw air compressor in accordance with the embodiment of the present invention.

Such media as water or oil are added during the compression of the screw compressor, and a certain proportion of moisture is produced at the same time. The mixed gas is discharged after being compressed and reaching the designed pressure, and flows into the gas-liquid separator 6 which is provided with a first gas-liquid inlet 61 tangentially connected with the side wall of the gas-liquid separator 6 with a vertical downward cyclone separator and an upper gas outlet 62. The compressed air after being separated from the mixed gas by the gas-liquid separator and being cooled by a cooler 71 when passing through the upper gas outlet 62, is transmitted to users via a gas tube 8; as shown in FIGS. 1, 2 and 4; the gas-liquid separator is provided with a vertical downward cyclone separator, so as to achieve a high-effective separation of the gas and the liquid. In the meanwhile, the gas-liquid separator generates a vertical downward force for the purpose of a stable operation.

As shown in FIGS. 1, 2 and 4, the gas-liquid separator 6 has a side wall with a first oil outlet connected to a mid section of the side wall, a plurality of oil distributors 12,13 receives the processed oil from the gas-liquid separator via the first oil outlet 63, a first filter 64 for eliminating the solid impurities, and flows into a cooler 7 via a clean oil tube 65, which injects clean lubricating oil into the lubricating components of the primary screw compressor and the secondary screw compressor so as to lubricate the moving components in the compressor, i.e. the oil cooled is injected into the screw compressor once again via a liquid injection valve, thereby conducting the oil closed circle.

The processed oil from the gas-liquid separator 6 still contains a bit of moisture, which has a serious influence on the lubrication condition and performance of the moving components and further affects the operational performance and service life of the screw compressor.

To enhance the operational performance and the service life of the screw compressor, a secondary oil-water separator 9 is added for the purpose of provision of a higher quality working oil and lubrication performance for the screw compressor via inducing the processed oil from the gas-liquid separator 6 to pass through the secondary oil-water separator 9 so as to further eliminate the moisture in the oil.

The secondary oil-water separator 9 is connected between the first oil outlet 63 and the oil distributors 12, 13, i.e. the processed oil from the gas-liquid separator 6 is divided into two parts via the first oil outlet 63. One is finally injected into the primary screw compressor 21 and the secondary screw compressor 22 after passing through the first filter 64, the cooler 7, the oil tube 11 and the oil distributors 12, 13; the other is eventually injected into the primary screw compressor 21 and the secondary screw compressor 22 via the oil distributors 12,13 after passing through the secondary oil-water separator 9, the second filter 66 and the cooler 7 to the oil tube 11.

Figure 3:
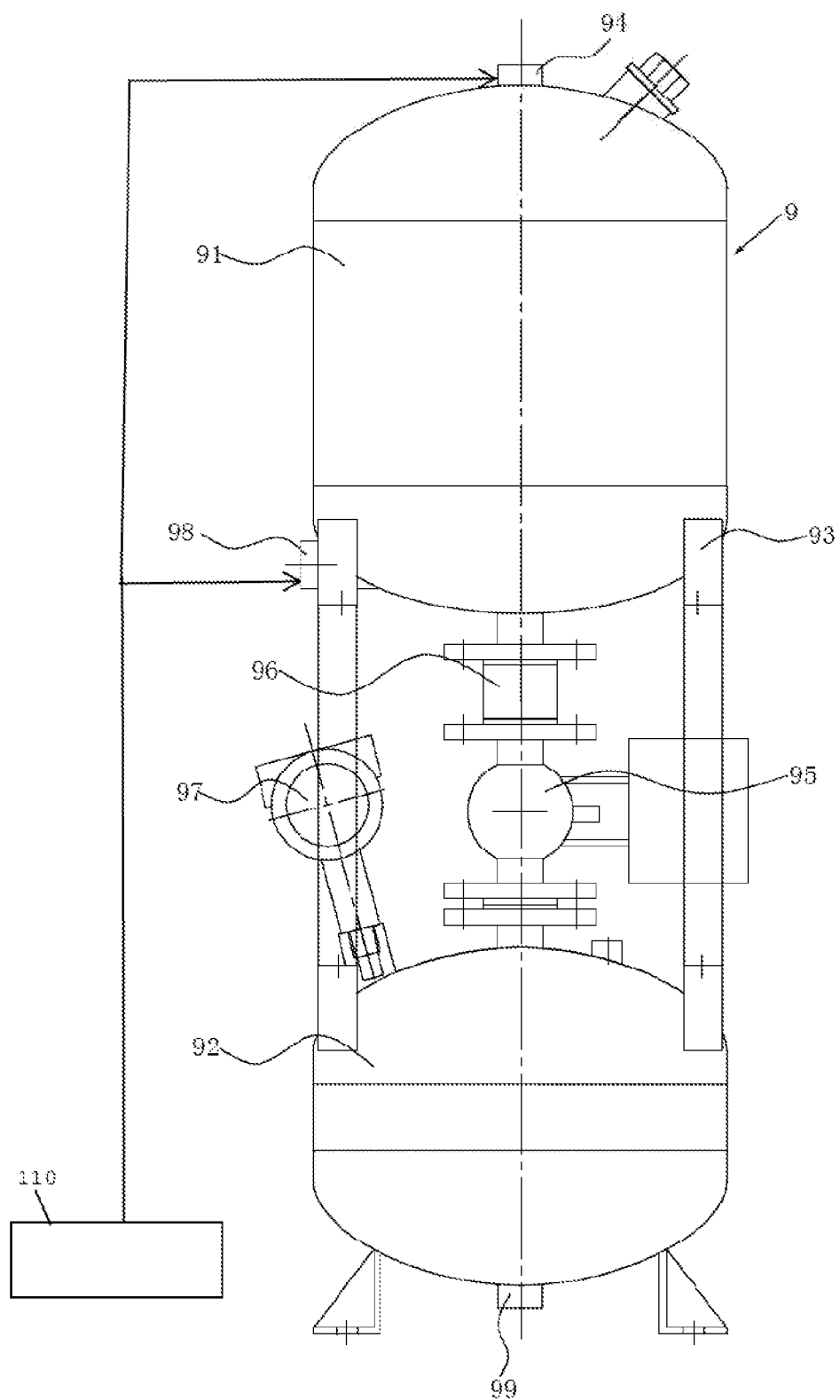
FIG. 3 is a perspective view of a secondary oil-water separator of the two-stage medium-pressure screw air compressor in accordance with the embodiment of the present invention.

The secondary oil-water separator has an upper separating tank 91 with a top and a bottom and a lower separating, tank 92 with a top and a bottom, a plurality of brackets 93 is mounted on the lower separating tank 92 and the upper separating tank 91 is mounted on top of the plurality of brackets 93; a second oil inlet 94 is connected to the top of the upper separating tank 91, the second oil outlet 98 having an electromagnetic valve is connected to the oil tube 11; an electric ball valve 95 connects the upper separating tank 91 to the lower separating tank 92 enabling liquid to flow or isolated between two separating tanks 91,92; a transparent tube 96 is connected on top of the electric ball valve 95 for observing the separation of the water and the oil between the upper separating tank 91 and the lower separating tank 92; an oil-water interface detector 97 is connected to the top of the lower separating tank 92 for observing the interface status of the water and the oil in the lower separating tank 92; the secondary drain electromagnetic valve 99 is connected to the bottom of the lower separating tank 92, as shown in FIG. 3, the moisture separated by the secondary oil-water separator is discharged from the secondary drain electromagnetic valve 99 at the water outlet.

The working process of the secondary oil-water separator 9 is indicated as follows:

Step one: The qualified lubricating oil is injected into the upper separating tank 91, and the qualified lubricating oil at the lower portion is transmitted to the oil distributors 12,13 via the second oil outlet 98 communicated with the oil distributors 12, 13, so as to inject the qualified lubricating oil into the screw compressor; the second oil outlet 98 is also communicated with the lubricating parts of the secondary screw compressor 22, as a result of the comparatively high working pressure of the secondary screw compressor and the relatively strict requirements on the lubrication condition and performance of the moving components. The high-quality lubricating oil output from the second oil outlet 98 can meet the aforesaid condition;

Step two: When the qualified lubricating oil in the upper separating tank 91 has run out, the electromagnetic valve of the second oil outlet 98 and the second oil inlet 94 can be controlled via the Programmable Logic Controller 110, with a timing relay to open the second oil inlet 94 and close the second oil outlet 98. After the second oil inlet 94 is opened, the oil containing a bit of moisture, from the first oil outlet 63, mixes with the remaining, qualified lubricating oil in the upper separating tank 91. And the whole upper separating tank 91 is filled with the moisture-contained oil; in the meanwhile, the upper separating tank 91 is communicated with the lower separating tank 92 after the electric ball valve 95 is opened, and the moisture-contained oil in the upper separating tank 91 flows into the lower separating tank 92, (the working condition at the moment can be observed from the transparent tube 96);

Step three: When the moisture-contained oil in the lower separating tank 92 increases gradually, the oil floats on the water naturally due to the water deposition at the lower portion as a result of its high specific density; then the qualified oil free of moisture is transmitted to the upper separating tank 91 via the electric ball valve 95 (the working condition at the moment can be observed from the transparent tube 96), and then transmitted to each lubricating components through the second oil outlet 98 again;

Step four: When the water level gradually rises to the limited value (can be read and measured from the oil-water interface detector 97), the electric ball valve 95 is closed, and the secondary drain electromagnetic valve 99 is opened in the meanwhile so as to discharge all moisture in the lower separating tank 92.

The moisture contained in the oil which is separated by the secondary oil-water separator is continuously eliminated in cycles as the above-mentioned, steps for the purpose of a provision of better-qualified lubricating oil.

The electromagnetic valve of the second oil inlet and electromagnetic valve of the second oil outlet as well as the secondary drain electromagnetic valve and the electric ball valve are controlled by the Programmable Logic Controller so as to have an accurate control on the second oil inlet, the second oil outlet, the communication of the electric ball valve, as well as the time, the flow and relevant parameters of the secondary drain, thereby maintaining the designed functions of the secondary oil-water separator.

In the present invention, a structure design in the combination of the upper separating, tank and the lower separating, tank is adopted by the secondary oil-water separator, which, apart from a simple and reasonable structure and a significant cost reduction in the manufacture and maintenance, is also convenient for use and installation.

In the present invention, the quality of the working oil in the two-stage medium-pressure screw air compressor can be precisely controlled, and the water as well as the impurities contained in the lubricating oil can be eliminated at a largest extent, so as to create essential condition for ensuring the screw compressor to operate continuously, stably and safely.

In the present invention, the motor, the primary screw compressor and the secondary screw compressor, the gas-liquid separator, the first filter, the cooler and the secondary oil-water separator are installed on the same base, which is achieved a compact structure and reduction of floor area.

The present invention can provide high operational reliability, safety and long service life in a long term use.

The invention claimed is:

1. A two-stage medium-pressure screw air compressor, comprising:

a primary screw compressor driven by a motor;

a secondary screw compressor also driven by the motor;

a gas-liquid separator having a side wall with a first gas-liquid inlet connected to the side wall and a first oil outlet connected to a mid section of the side wall, the secondary screw compressor communicating with the gas-liquid separator via the first gas-liquid inlet;

a plurality of oil distributors for receiving processed oil from the gas-liquid separator via the first oil outlet, a first filter, a cooler and an oil tube;

a secondary oil-water separator connected to the first oil outlet of the gas-liquid separator, the secondary oil-water separator having an upper separating tank with a top and a bottom and a lower separating tank with a top and a bottom, a plurality of brackets being mounted on the lower separating tank and the upper separating tank being mounted on top of the plurality of brackets;

a second oil inlet connecting to the top of the upper separating tank, the second oil inlet having an electromagnetic valve;

a second oil outlet connecting to the bottom of the upper separating tank, the second oil outlet having an electromagnetic valve, the second oil inlet connected to the first oil outlet;

an electric ball valve connecting the upper separating tank to the lower separating tank enabling liquid to flow between the two separating tanks; and a secondary drain electromagnetic valve connected to the bottom of the lower separating tank.

2. The screw air compressor of claim 1, further comprising a second filter for connecting the secondary oil-water separator to the plurality of oil distributors, and the second filter being connected to the second oil outlet.

3. The screw air compressor of claim 1, further comprising a transparent tube connected between the electric ball valve and the upper separating tank.

4. The screw air compressor of claim 1, further comprising an oil-water interface detector connected to the top of the lower separating tank.

5. The screw air compressor of claim 1, wherein the electromagnetic valve of the second oil inlet and the electromagnetic valve of the second oil outlet, the secondary drain electromagnetic valve as well as the electric ball valve are controlled by a Programmable Logic Controller.

6. The screw air compressor of claim 1, wherein the motor, the primary screw compressor and the secondary screw compressor, the gas-liquid separator, the first filter, the cooler and the secondary oil-water separator are respectively installed on a base.

7. A two-stage medium-pressure screw air compressor, comprising:
- a primary screw compressor driven by a motor;
- a secondary screw compressor, with an output, also driven by the motor;
- a gas-liquid separator with a top, a side wall, having a gas outlet connected on the top, a first gas-liquid inlet connected on the side wall tangentially, and a first oil outlet connected on the side wall below the first gas-liquid inlet, the output of the secondary screw compressor connecting to the first gas-liquid inlet and enabling the secondary screw compressor to communicate with the gas-liquid separator;
- the first oil outlet connected to the gas-liquid separator;
- a first filter connected to the first oil outlet;
- a cooler, with an inlet, connected to the first filter;
- a plurality of oil distributor connected to the cooler through an oil tube;
- a secondary oil-water separator with an upper separating tank with a top and a lower separating tank with a top and a bottom, the upper separating tank being separated from the lower separating tank by a frame;
- a second oil inlet with an electromagnetic valve connected to the top of the upper separating tank;
- a second oil outlet with an electromagnetic valve connected to the bottom of the upper separating: tank, and the second oil inlet being connected to the first oil outlet;
- an electric ball valve connecting the upper separating tank to the lower separating tank and enabling liquid to flow between the two separating tanks; and
- a secondary drain electromagnetic valve connected to the bottom of the lower separating tank.

8. The two-stage medium-pressure screw air compressor of claim 7, wherein the second oil outlet of the secondary oil-water separator is connected to the inlet of the cooler.

* * * * *